United States Patent [19]
Buckethal

[11] 3,816,181
[45] June 11, 1974

[54] STORAGE BATTERY AND CASE THEREFOR

[75] Inventor: Paul J. Buckethal, Villa Hills, Ky.

[73] Assignee: Globe-Union Inc., Milwaukee, Wis.

[22] Filed: Dec. 9, 1971

[21] Appl. No.: 206,451

[52] U.S. Cl.................... 136/166, 264/327, 150/.5, 220/72
[51] Int. Cl. ............................................ H01m 1/00
[58] Field of Search ............ 136/166, 176; 264/327, 264/92; 215/1 C; 220/72; 150/.5

[56] References Cited
UNITED STATES PATENTS

| | | | |
|---|---|---|---|
| 2,606,708 | 8/1952 | Irvan | 215/1 C |
| 3,248,000 | 4/1966 | Lurie | 220/72 |
| 3,281,283 | 10/1966 | Ralph | 136/166 |
| 3,388,007 | 6/1968 | Fiandt | 136/166 |
| 3,424,623 | 1/1969 | Oakley et al. | 136/166 |

*Primary Examiner*—A. B. Curtis
*Assistant Examiner*—J. A. Feeley

[57] ABSTRACT

An improved storage battery and case therefor are disclosed in which the storage battery case is fabricated of a polyolefin, and preferably, polypropylene. The bottom, side walls, end walls and partitions are of substantially uniform thickness and have a thickness generally less than .100 inch. The corners of the battery case have a reduced thickness significantly less than the thickness of the side and end walls adjacent to the corners such that certain forces and stresses within the case and the material from which it is made are relieved whereby the case remains more rectilinear.

Furthermore, the reduction in the thickness of the corners provides improved strength characteristics in the overall product. A unique method of manufacturing such a battery and battery case is provided including prescribed mold characteristics and controls over molding temperatures and cooling rates.

18 Claims, 7 Drawing Figures.

PATENTED JUN 11 1974 3,816,181

STORAGE BATTERY AND CASE THEREFOR

FIELD OF THE INVENTION

This invention relates to storage batteries and storage battery cases and to the methods of manufacture thereof. Historically, storage battery cases, especially storage battery cases for automotive use, were manufactured from rubber and rubber compounds. The rubber and rubber compounds were formed with relatively thick walls usually in the order of .250 inch and the walls were rigid for all practical purposes. It is recognized, of course, that the terms "rigid" and "flexible" are relative terms, but in the present context, flexible is intended to refer to a battery case in which the walls are sufficiently flexible so that adjacent walls can be deformed under finger pressure to touch or substantially touch without fracture and the weight of the components of the electrolyte within the battery are sufficient to produce measurable deflection of those walls. The prior art batteries, having cases formed of rubber or rubber compounds were rigid and also relatively brittle, that is, if the case or the battery were dropped, the walls would be likely to fracture rather than yield.

A basic change occurred in the automotive battery field with the invention of the thin wall polypropylene battery case as described and claimed in U.S. Pat. No. 3,388,007 which issued to R. M. Fiandt on June 11, 1968. The automotive storage battery manufactured with the thin wall polypropylene battery case of the Fiandt patent had surprisingly different physical characteristics and parameters from automotive batteries known prior to that time.

The batteries were manufactured with standardized outside dimensions according to industry recognized group designations.

However, because of the uniform thin wall polypropylene case construction, the volume of the inside cavities of the battery were substantially greater than previously believed possible. This permitted increased numbers and sizes of battery elements and increased electrolyte providing greatly enhanced low temperature starting, total capacity and other battery characteristics.

Furthermore, by selecting a polyolefin such as polypropylene, with the physical parameters approximating those set forth in the Fiandt patent, it is possible to manufacture a battery having case walls with dimensions of about .100 inch or less and such walls have a combination of flexibility, tensile strength, density and low porosity providing an automotive battery of standardized dimensions with enhanced electrical properties which is also stronger and less subject to impact failure than batteries previously known. Such thin wall polypropylene batteries are sold today in very large quantities and have been recognized and accepted to a rapidly increasing extent over the past five years or more capturing a rapidly increasing percentage of the market.

DESCRIPTION OF THE PRIOR ART

While the thin wall polypropylene battery has been a revolutionary breakthrough in the automotive battery field and is substantially replacing the prior art batteries having rigid cases formed of rubber, rubber compounds, polystyrenes or the like, such batteries and their cases have presented certain manufacturing and structural problems.

First, because of the nature of the polyolefin materials which are used, certain stresses and resulting strains are produced within the thin wall battery case at the time of and following molding. In particular, it has been found that because of the nature of the polyolefin materials, there is a shrink characteristic at the corners of the thin wall polypropylene cases causing the end walls of the battery to bow inwardly as the corners which are formed substantially orthogonally shift in cooling to an angle less than 90°. Such a distortion or inward bow of the end walls produces aesthetic objections and also renders further assembly processes more difficult. There is a corresponding tendency of the side walls to bow inwardly but the side walls are generally restrained by the partitions, rendering the bowing less severe and less pronounced.

Furthermore, while the thin wall polypropylene batteries have shown substantially enhanced overall strength characteristics, nevertheless, they have exhibited some relative weakness when subjected to impact at the corners.

Various approaches to the solution of the foregoing problems or objections have been attempted. It has been found that by placing spacers or wedges within the case cavities immediately following molding and thus urging the end walls outwardly, the end wall deformation and corner shrinkage can be minimized and substantially straight end walls can be produced. This, however, does not alter the strength or impact characteristics of the corners in any perceptible way. It also adds to the time and cost of manufacture.

Another approach which has proven partially satisfactory is to stress the corners after the cases have been molded and cooled. Thus, by striking the outer surface of the corner, while rigidly maintaining the walls in place from the inside immediately adjacent to the corner, it is possible to stress the corner and relieve some of the molding stresses whereby the end walls can be straightened to a perceptible extent.

While such post-molding treatment does not produce a perceptible detrimental effect on corner strength or impact resistance, the stress is visible because of a change in appearance of the polyolefin and this has been considered objectionable by some consumers.

Another partial solution to the problems set forth above has been the use of assembly jigs and devices to engage the end walls by suction or otherwise at the time that the cover is applied to the case. Thus, the end walls can be pulled outwardly to better align with the cover. Once the cover and case are assembled and secured together, the free edges of the end walls will be retained in a substantially straight orthogonal relationship by the cover. However, this will solve only partially the problems discussed above and is also an additional and somewhat expensive manufacturing process.

SUMMARY OF THE INVENTION

In accordance with the present invention, a new automotive storage battery and a new thin wall polyolefin storage battery case have been developed and a unique method for manufacture thereof has been discovered which enables the manufacture of batteries and cases having improved strength and impact characteristics, improved ease of assembly and enhanced aesthetics. Specifically, in accordance with the present invention, the thin wall polyolefin battery case, including a case bottom, side walls, end walls and partitions is formed with corners connecting the side and end walls which are substantially thinner than either the adjacent portions of the side walls or the adjacent portions of the end walls. It has been found that by reducing the thickness of the corners over a substantial portion of their length the internal stresses generated during molding are partially relieved and the end walls will remain straight or substantially straight following molding and cooling.

Furthermore, it has been surprising to find that reducing the thickness of the corners of the thin wall polyolefin battery case has not resulted in a measurable loss of strength or impact resistance, but on the contrary, tests have shown that such thin corners actually enhance the impact characteristics and improve the overall physical characteristics of the battery.

It has also been discovered that optimum results are obtained in manufacturing the thin wall polyolefin battery case with thin corners in order to get improved impact characteristics and improved wall configurations by controlling certain operating conditions. If the molds and mold cores are operated in a correlated fashion and the temperature of the molds and mold cores are carefully controlled during forming and cooling, end wall linearity is optimized.

Thus, it is a principal object of this invention to provide an improved automotive type storage battery having standardized outside dimensions and thin wall polyolefin walls with enhanced appearance, improved impact strength and lower cost as a result of simplified and improved manufacturing processes and techniques.

More specifically, it is an object of this invention to provide an improved thin wall polyolefin battery having a case bottom and side and end walls wherein the corners joining the side and end walls have reduced thickness in order to enhance impact strength, assembly techniques and battery aesthetics.

BRIEF DESCRIPTION OF THE DRAWINGS

The invention will now be described in greater detail by referring to the accompanying drawings wherein.

DESCRIPTION OF THE PREFERRED EMBODIMENTS

Figure 1:
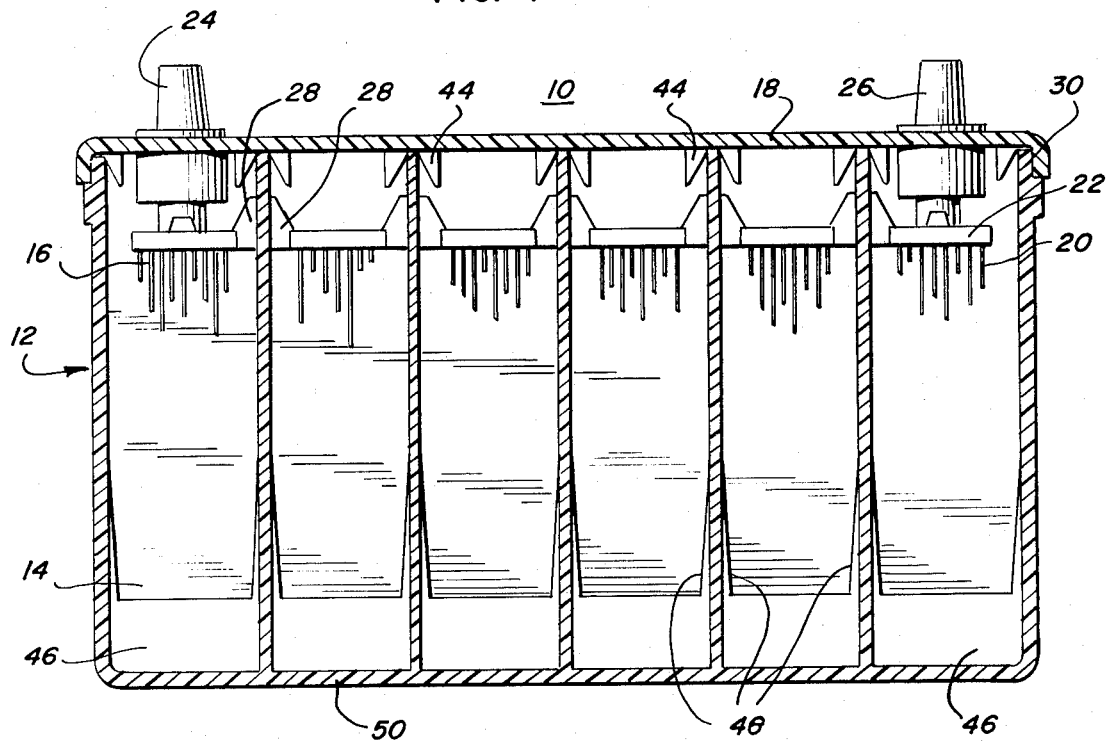
FIG. 1 is a diagrammatical vertical elevation through a 12-volt, six-cell battery made in accordance with this invention.
Figure 2:
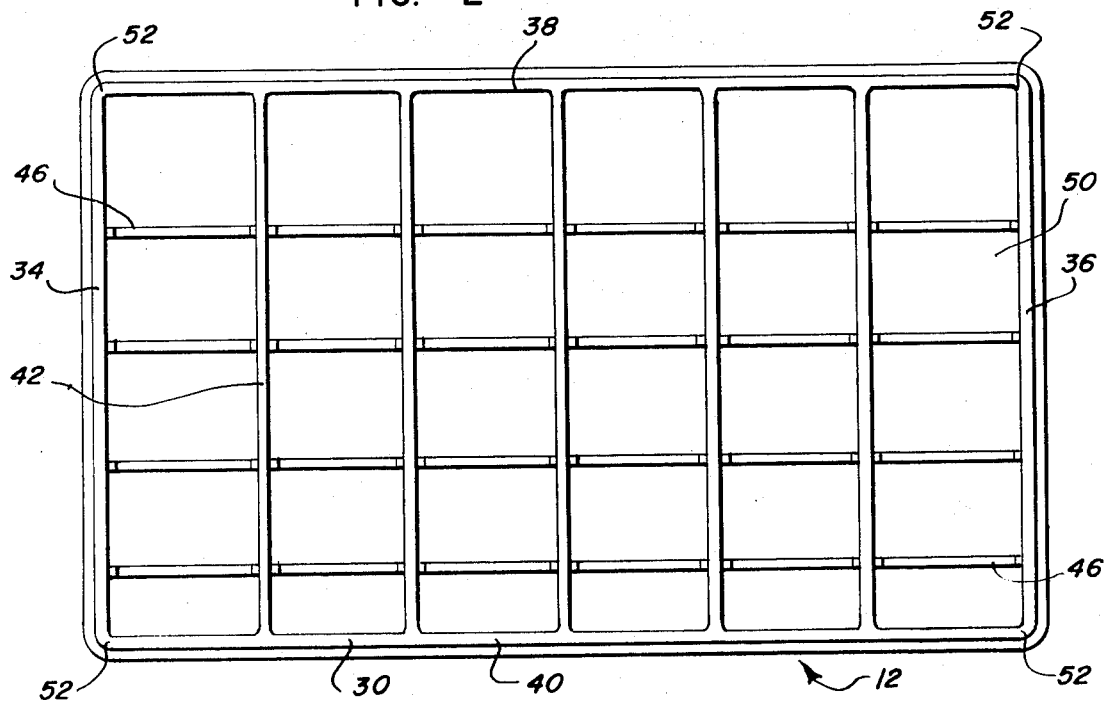
FIG. 2 is a top plan view of the battery case forming a part of the battery of FIG. 1.

Referring now to the drawings, and more particularly, to FIGS. 1 and 2, an automotive storage battery 10 is shown comprising a case 12 containing six cell cavities 14, each containing an electrical element assembly 16 with all of the cavities 14 enclosed and sealed with a cooperating cover 18. The electrical elements 16 are only shown in fragmentary form, but it will be understood that each cell comprises a plurality of positive and negative plates 20 assembled together and hung from two supporting straps 22 which provide the electrical terminals for that particular cell. With respect to the two end cells, one of the straps 22 is connected to the positive and negative posts 24 and 26. The other strap is connected by an intercell connector 28 to the next adjacent cell through a corresponding intercell connector 28 contained therein. The intermediate cells are similarly interconnected by connectors 28.

Figure 5:
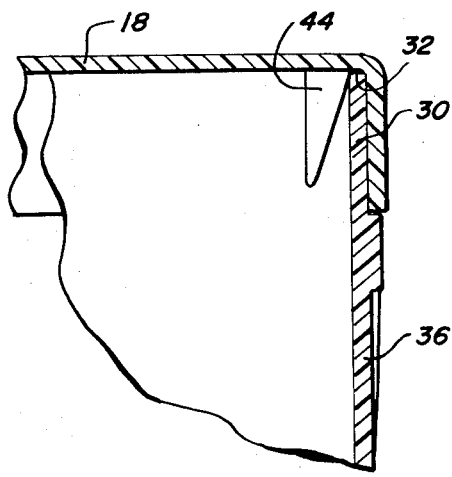
FIG. 5 is a fragmentary view of the junction between the end wall and cover of the battery of FIG. 1.

It is critical in battery manufacture and especially in automotive battery manufacture that each cell cavity 14 be isolated from adjacent cell cavities to prevent electrical leakage therebetween. Prior to the development of the thin wall polypropylene battery, the upper free edges of the battery case were sealed to one or more covers by either a large amount of a plastic battery compound or an epoxy or similar cement. With the development of the thin wall polypropylene battery case, it is now an accepted practice to form a seal between the upper edge 30 of the case 12 with a corresponding peripheral portion 32 of the cover 18 by thermally plasticizing either the edge 30 or the peripheral portion of the cover 32 or both and physically welding the two together in a sealed relationship. These parts are more clearly illustrated in FIG. 5.

The case 12 basically comprises end walls 34 and 36, side walls 38 and 40 and intercell partitions 42. All of these walls have upper edges 30 which must be welded or appropriately sealed to the cover 18. While various techniques of butt welding, tongue and groove assembly and the like have been utilized, the practice in the instant invention is to provide a relatively smooth inner surface on the cover 18 to which the upper edges 30 are welded thermally. In order to locate the upper edges 30 at the desired positions on the cover 18, a plurality of guides 44 are formed integrally with the cover 18.

Returning to FIG. 1, each cell cavity 14 has molded in the bottom portion thereof a plurality of supports or mud rails 46. These mud rails 46 provide a space for any solid material to accumulate which may be generated during the use of the battery or which may be inadvertently placed in the battery through the conventional vent and filling openings (not shown). Associated with each mud rail 46 are a pair of ribs 48 which extend upwardly from the bottom 50 of the case to a point somewhat more than half way up the end walls 34 and 36 and the partitions 46. The ribs 48 are preferably of approximately the same width or thickness as the various walls and taper from the bottom toward the top. The ribs provide some strength in the various walls and also insure a space between the walls and battery elements to accommodate electrolyte.

The specific details of the battery construction conform generally to the teaching of Fiandt U.S. Pat. No. 3,388,007. For example, the walls are all generally uniform as that term is defined in the Fiandt patent, that is, the draft is minimized in all of the molds and cores to approximately 10 percent of what was then considered normal prior art taper or about .004 inch per inch.

The case 12 and the cover 18 are molded of a polyolefin having the physical parameters which have been found satisfactory for the manufacture of thin wall automotive battery cases and these are generally as set forth in Fiandt U.S. Pat. No. 3,388,007. While any polyolefin having adequate flexibility, impact resistance and tensile strength would be satisfactory for practicing the instant invention, to date the only satisfactory materials which have fallen within these physical requirements are polypropylene materials and preferably either polypropylene materials containing some filler or a copolymer of propylene and ethylene in a small amount.

Figure 4:
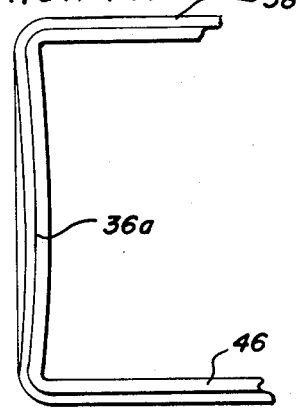
FIG. 4 is a fragmentary view of one end wall and portions of the adjacent side walls exemplifying the prior art.

It is desirable in manufacturing battery cases, both for functional and aesthetic reasons, that all of the thin walls, sides, ends and partitions be substantially straight. However, because of the nature of polyolefins, it has been found that this is a very difficult characteristic to accomplish. In particular, it has been the experience in the manufacture of thin wall polypropylene cases that the end walls 34 and 36, as shown in FIG. 2, do not remain straight, as shown, but, by their very nature, bow inwardly to form a concave outer surface 36a as shown in FIG. 4. While a slight inward bow is tolerable and actually facilitates assembly, in preference to an outward bow, which would interfere with the application of the cover, the bow detracts from the product aesthetically, and if it exceeds a very small amount makes assembly difficult.

Figure 3:
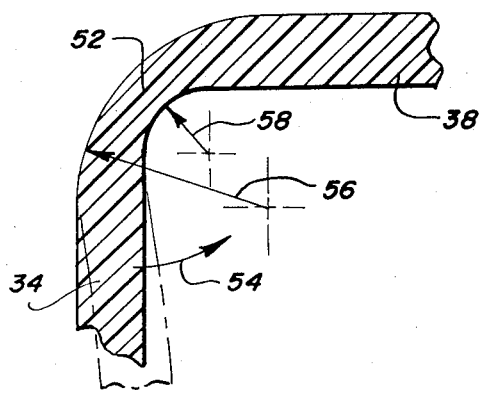
FIG. 3 is an enlarged fragmentary sectional view of one corner of the case of FIG. 2.

In accordance with this invention, it has been found possible to produce substantially straight end walls, such as walls 34 and 36 of FIG. 2 if the walls and corners and constructed generally in accordance with FIG. 3. As shown in FIG. 3, a much enlarged fragmentary view of one corner of the battery case of FIG. 2, the side wall 38 has a transverse dimension adjacent the bottom 50 of the case in the order of .085 inch. There is a slight taper in the thickness of the wall to facilitate removal of the cores so that adjacent the upper free edge of the side wall, the thickness will be slightly less with a minimum dimension in the order of .070 inch.

Similarly, the end wall 34 shown in FIG. 3, has a dimension adjacent the bottom 50 in the order of .095 inch and the upper free edge of the end wall is somewhat less, also in the order of .070 inch.

In prior thin wall polypropylene battery cases, the corners 52 were of the same order of thickness as the end walls 34 and side walls 38 and no special recognition was given to any significance in the corner dimensions. It has been found that it is the nature of polyolefin materials, when formed with a corner such as the corner 52, that there is a shrinkage characteristic tending to move the end wall 34 in the direction indicated by arrow 54 whereby the end wall will assume an inward, concave bow.

It has further been found that by reducing the thickness of the corner 52, the corner is rendered more flexible, apparently permitting the end wall to remain straight and relieving the stresses which cause the concave arcuate configuration. In one embodiment of this invention, it has been found highly satisfactory to employ a radius 56 for the outer surface of the corner 52 of approximately one-quarter inch while employing a radius 58 for the inner surface of the corner 52 of one-eighth inch. Such radii, when employed in conjunction with the wall thickness mentioned above, will produce a corner thickness in the order of .050 inch to .065 inch which is well within the acceptable range provided in accordance with the invention.

It has been found that satisfactory corners can be made within the range of about .080 inch to about .025 inch. The lower limit is selected primarily to provide adequate tensile strength and wall thickness to prevent pinholes, cracking, tearing or other mechanical failure. The upper limit has been found satisfactory commensurate with the wall thickness to permit the corner sufficient flexibility so that the end wall can overcome any corner stresses and remain straight.

In general, it has been found that the corner thickness should be approximately 20 percent less than the thickness of the portions of the end walls and side walls immediately adjacent to that particular portion of the corner.

When the thin corners were first tested in the development of this invention, it was contemplated that such thin corners might result in a reduced impact strength or other detrimental physical characteristic in the ultimate battery. Surprisingly, the use of the reduced thickness corners, as taught herein, has provided batteries with impact strength greater than the same batteries heretofore manufactured with corners of greater thickness. It is believed that this improved characteristic is the result of greater flexibility and a balanced overall battery construction in which the fluid forces of the electrolyte within the battery upon impact can be distributed and absorbed over a period of time by virtue of the flexing of the walls and corners.

While in the preferred embodiment of this invention illustrated in FIG. 3, two appropriate corner radii are employed on the inner and outer wall surfaces to obtain the desired thin corners, such a circular surface treatment is not required in order to accomplish the invention. It is possible to shape the corners in any appropriate manner in order to obtain the thin section. For example, as shown in FIG. 7, the mold core may merely have a flattened corner 60 which will provide the reduced thickness desired, providing a modified corner 52a interconnecting the side wall 38a and the end wall 36b in an appropriate stress relieved configuration.

While the thin corner may extend over the entire length of the intersection of the side and end walls, that is, from the bottom 50 to the free edges and cover 18 in FIG. 1, it is not necessary that the thin corner extend over the entire height of the battery. It has been found that if the corner is reduced in thickness over approximately 50 percent of its vertical extension, this is sufficient to relieve the stresses within the corner and provide straight end walls.

Furthermore, because of the inherent characteristics of mold and core manufacturing, and the desire to provide adequate material at the bottom corners of the battery, it will generally be desirable to start the thin corner at least 1 inch or more above the bottom 50.

Figure 7:
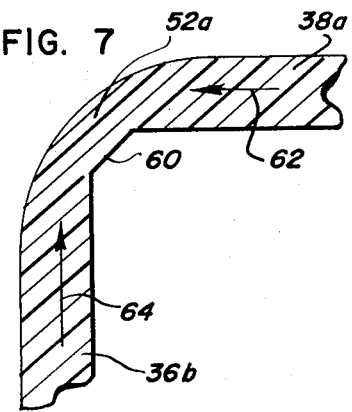
FIG. 7 is a fragmentary illustration of an alternate corner construction incorporating the features of this invention.

As indicated in FIG. 7, the flow of material during molding from the side wall 38 or 38a to the corner 52 or 52a is desirably along the line indicated by arrow 62. Similarly, arrow 64 indicates the flow of material from the end wall 36 or 36b to the corner 52 or 52a. It has been found that the stress characteristics within the polyolefin are related to the flow direction during molding, and that optimum flexibility in the corners 52 or 52a is obtained if the flow is in the direction indicated by the arrows 62 and 64.

Such a flow characteristic can be obtained within the teaching of this invention over a major portion of the vertical extension of the corners. However, in general, a short distance above the bottom 50, the flow may be upwardly along the corner rather than transversely into the corner as illustrated by the arrows.

Figure 6:
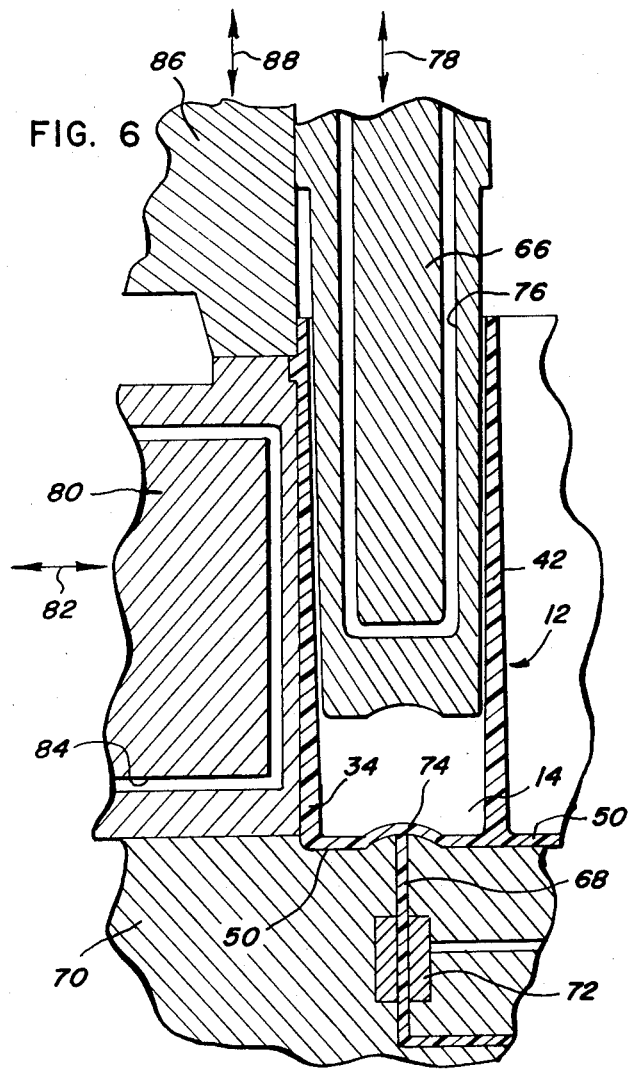
FIG. 6 is a fragmentary diagrammatic illustration of the molding apparatus for forming a battery case in accordance with this invention.

Referring more particularly to FIG. 6, one desirable molding method and apparatus is diagrammatically illustrated in fragmentary form. A portion of a core 66 is shown partly removed from a cell cavity 14 which forms a part of a battery case 12. The bottom 50 extends to the right in FIG. 6 to form additional cells and only one partition 42 is shown although it will be understood that there are four additional partitions and a right end wall in a typical 12-volt, six-cell battery. The left end wall 34 is also shown as is the bottom 50 and a sprue 68 extending from the bottom into the mold 70. Heater means 72 surrounds the sprue 68 adjacent to the orifice where the plastic material enters the mold cavity in order to maintain the polyolefin in a plastic condition during molding. A slight hump 74 is preferably formed in the bottom 50 in order to accommodate the remainder of the sprue 68 after the battery case 12 is separated from the mold 70.

The mold core 66 is provided with a passageway 76 through which a cooling fluid is normally circulated. The core 66 is movable in the directions indicated by the arrows 78 to facilitate removal of the cores from the molded product and subsequent removal of the molded product from the mold. One side plate 80 of the mold is shown diagrammatically in position relative to the mold base 70 and the side plate 80 is movable in the directions indicated by arrows 82 in order to further facilitate removal of the molded part 12. The movable mold plate 80 also has a fluid passageway 84 formed therein through which a cooling fluid is passed in normal operation.

A mold closure 86 is mounted adjacent the mold plate 80 and is movable in the directions indicated by arrows 88. The mold core 66 is mounted on mold closure 86 and is slideable relative thereto as indicated by arrows 78. The mold closure 86 is, in turn, movable carrying the core 66 with it in the manner indicated by arrow 88. Thus, once a battery case 12 has been molded and partially cooled, the sequence of operations causes the core 66 to move upwardly in FIG. 6 as indicated by arrow 78 freeing the core from the inner faces of the battery case cavity 14. Thereafter, the core 66 and mold plate 86 move together as indicated by arrow 88 freeing the upper end of the molded part at about the same time the mold plate 80 moves outwardly in the manner indicated by arrow 82 permitting the battery case 12 to be discharged from the mold. At this time, the sprue 68, which is still molten, is automatically severed and the mold is ready for closure to receive another injection of plastic polyolefin. Thus, the side plate 80, the closure plate 86 and the core 66 return to their normal molding positions and pressure is applied to the plastic so that it flows through the sprue 68 into the mold cavity.

In order to provide the benefits of the instant invention, the mold core 66 is provided with much sharper or squarer corners, thus reducing the amount of plastic material injected into the corners where the side walls and end walls are joined.

Furthermore, the inherent flow of plastic polyolefin, as illustrated in FIG. 6, is upwardly through sprue 68 into the bottom cavity 50 where the plastic spreads and rises in the side walls and end walls substantially simultaneously. As this occurs, the last portion of the mold to fill at any given level displaced from the bottom 50 is the corner and, thus, the flow of plastic polyolefin into the corner is in the manner illustrated by the arrows 62 and 64 in FIG. 7.

This flow pattern, which is controlled by the overall design of the mold, the gating, and the product itself, insures the transverse flow of polyolefin into the thin corner section in order to provide the living hinge characteristics of the corner.

In practicing this invention, it has been found that optimum corner characteristics, and specifically, optimum straight end walls 36 are obtained if the temperatures of the side plates 80 and mold core 66 are controlled and correlated. In the optimum operation of this invention the mold plates 80 are maintained at approximately the same temperature as the portion of the core 66 adjacent to the free edges of the battery case walls. In general, it has been found that the core is operated in a temperature range providing a temperature between about 80° Fahrenheit and about 100° Fahrenheit at the top of the battery case. At the bottom of the battery case near the free end of the cores, the temperature is normally in the range of about 120° to 140° Fahrenheit and the temperature gradient within the core is generally linear.

In referring to "top" or "bottom" herein, it will be recognized that the molds may be operated in any position and the refernece is only to the battery case per se.

The slide 80 and similar slides on the other faces of the battery case 12 are maintained at approximately the same temperature within the range of about 80° to 100° Fahrenheit.

In performing tests on battery cases and batteries constructed in accordance with this invention, it has been found that if the corner thicknesses are reduced to a value less than about .025 inch, they may fail an electrostatic test which is normally performed on the battery cases to detect any weaknesses in the polyolefin material, pinholes or the like.

As will be well understood by the molding engineer, the duration of a molding cycle has direct bearing upon the temperature characteristics and temperature profiles discussed above. In particular, the dwell time of the part in the mold determines, in part, the mold temperature and the mold temperature profile. Thus, dwell time is an important factor which should be controlled in order to provide the temperatures and relationships described above.

Without further elaboration, the foregoing will describe the battery and battery case and apparatus and the method of manufacture thereof in sufficient detail to enable one skilled in the art to carry out the invention described.

I claim:

1. In a storage battery case made of a flexible polyolefin and having bottom, side and end walls, said side and end walls extending upwardly from said bottom to an open top edge, said side and end walls being sufficiently thin to normally bow inwardly by forces and stresses in said case said side and end walls being connected together along adjacent edges to form corners and define a generally rectilinear cavity, said side and end walls having predetermined thicknesses the improvement wherein said corners, over a substantial portion of their length, have thicknesses sufficiently less than the thicknesses of said side and end walls to substantially relieve said forces and stresses in said case to substantially reduce the inward bowing of said end walls thereby producing a substantially straight end wall adjacent said free edge.

2. The storage battery case of claim 1 wherein the thickness of said substantial portions of said corners should be less than about .080 inch.

3. The storage battery case of claim 1 wherein the thickness of said substantial portions of said corners should be at least about 20 percent less than the thicknesses of the adjacent portions of the side and end walls.

4. The storage battery case of claim 1 wherein said substantial portions of said corners have thicknesses in the range between about .025 inch and .080 inch.

5. The storage battery case of claim 1 wherein said substantial portions of said corners are generally intermediate between said bottom and the upper free edges of said side walls and said end walls.

6. The storage battery case of claim 1 wherein polyolefin flow lines within said side walls and said end walls adjacent said substantial portions of said corners is generally transverse to said corners.

7. The storage battery case of claim 1 wherein said side walls and said end walls are of generally uniform thickness not in excess of about .100 inch.

8. The storage battery case of claim 1 wherein the polyolefin is polypropylene.

9. The storage battery case of claim 1 wherein said side and end walls have thicknesses within the range between about .060 inch and about .100 inch and are of molded polypropylene and said substantial portions of the corners are thinner than said side walls and said end walls and have thicknesses within the range between about .025 inch and .080 inch.

10. The storage battery case of claim 1 including partition means wherein the cavity defined by said bottom, side walls and end walls is subdivided into a plurality of cell cavities by said partition means which sealingly engage said bottom and said walls.

11. The storage battery case of claim 1 wherein said substantial portions of said corners comprise arcuate webs having inner and outer radii, the outer radius being significantly greater than the inner radius plus the minimum thickness of the walls adjacent said substantial portions of said corners.

12. The storage battery case of claim 11 wherein said outer radius is at least about 20 percent greater than the inner radius plus the minimum thickness of the walls adjacent said substantial portions of said corners.

13. The storage battery case of claim 1 wherein said substantial portions of said corners comprise webs having an outer radius and an inner shape selected to provide a reduced web thickness intermediate said side and end walls.

14. The storage battery case of claim 1 wherein said substantial portions of said corners comprise webs having an outer generally cylindrical surface and an inner surface which extends outwardly into said corners a predetermined distance to provide a reduced web thickness intermediate said side and end walls.

15. A storage battery comprising a flexible case made of a polyolefin and having bottom, side and end walls, said side and end walls extending upwardly from said bottom to a free edge, said side and end walls being sufficiently thin to normally bow inwardly by forces and stresses in said case and being connected together along adjacent edges to form corners and define a generally rectilinear cavity, said side and end walls having predetermined thicknesses, the improvement wherein said corners, over a substantial portion of their length, have thicknesses sufficiently less than the thicknesses of said side and end walls to substantially relieve said forces and stresses in said case to substantially reduce the bowing of said end walls to thereby producing a substantially straight end wall adjacent said free edge, electrical battery elements disposed within the cavity defined by said bottom, side walls and end walls, and a cover made of a polyolefin and sealed to the free edge of said case to substantially seal said cavity, and electrically conductive means extending from said cavity for connection of said battery for use.

16. A storage battery of claim 15 including partition means wherein said cavity is subdivided into a plurality of cell cavities by said partition means which sealingly engage said bottom and said walls, electrical battery elements in each of said cavities and electrically conductive means interconnecting the elements in said plurality of cavities.

17. The storage battery of claim 16 wherein said cell cavities are substantially filled with electrolyte, said polyolefin being substantially inert in the presence of said electrolyte and the thickness of said walls and said corners being proportioned to contain said electrolyte within said cavities in the presence of substantial impact forces.

18. The storage battery of claim 16 wherein said wall thicknesses, said corner thicknesses and the physical parameters of the polyolefin are correlated whereby said end and side walls retain substantially the shape of the mold cavity in which they are fabricated.

* * * * *